April 11, 1933.  C. E. BAND  1,903,667
TRAP SHOOTING APPARATUS OR LAYOUT
Filed May 18, 1932   2 Sheets-Sheet 1

Charles Edward Band
INVENTOR
BY Victor J. Evans & Co.
ATTORNEYS

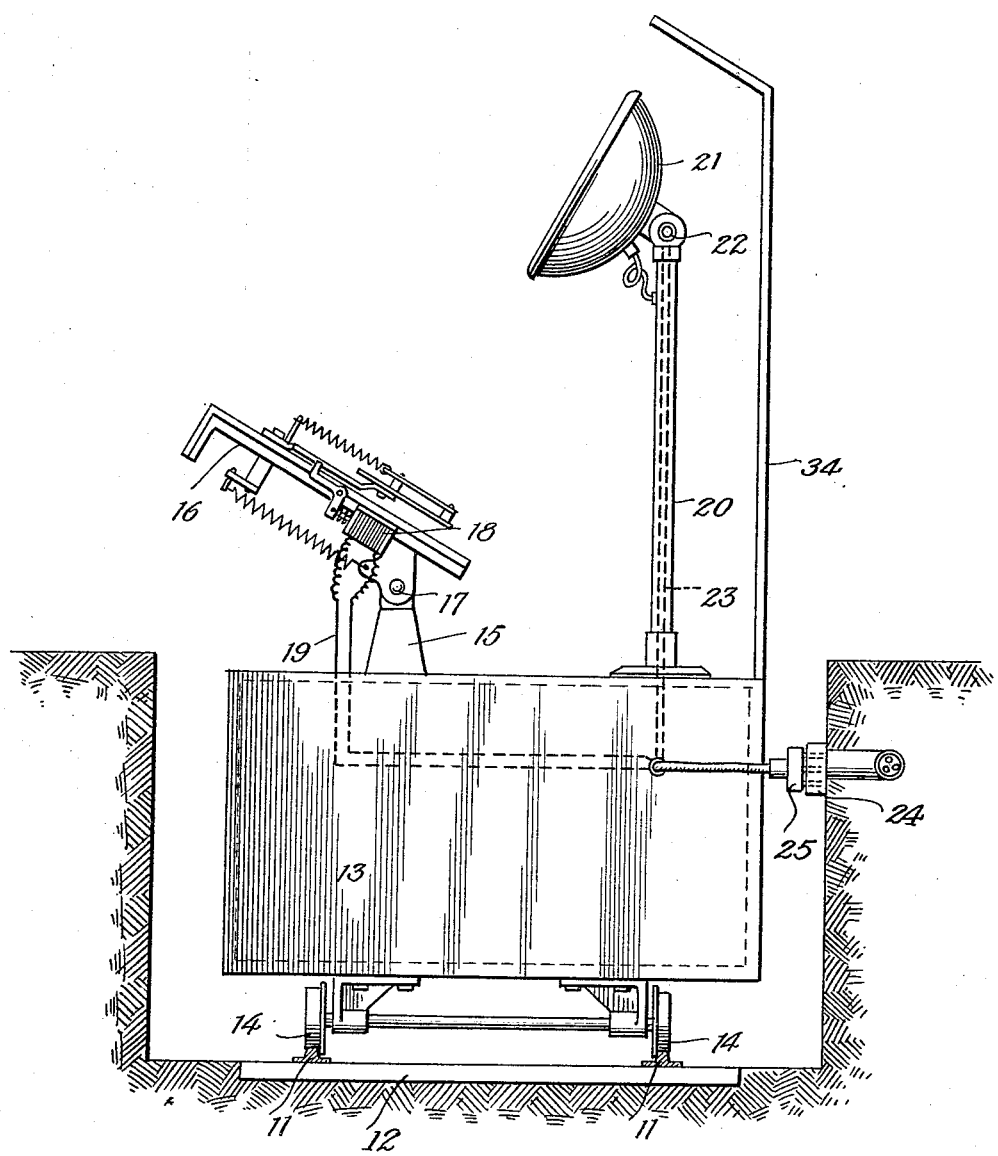

Patented Apr. 11, 1933

1,903,667

UNITED STATES PATENT OFFICE

CHARLES EDWARD BAND, OF LOS ANGELES, CALIFORNIA

TRAP-SHOOTING APPARATUS OR LAYOUT

Application filed May 18, 1932. Serial No. 612,122.

The invention relates to a trap-shooting apparatus and more especially to a layout for trap-shooting.

The primary object of the invention is the provision of an apparatus of this character, wherein the target trap is mobile and shiftable so as to locate the targets at different points, while the shooter has control of the targets, and the layout effects centralizing the shooters into a single group and enables the trap to be operated for locating the same by a single attendant or trap operator.

Another object of the invention is the provision of an apparatus of this character, wherein the layout consolidates the present skeet trap-shooting ground plan, 16 yard trap-shooting ground plan, and over decoy shooting ground plan into an area, whereby a group of clubs or shooters may shoot over the same traps and in this fashion centralizing the group and also in its make-up eliminates excessive expense in the use thereof by reducing duplicate trap boys, target pullers and record keepers as a single supervisor can control all of the group of shooters.

A further object of the invention is the provision of an apparatus of this character, wherein the target traps are under positive control of a shooter and in their layout it permits the traps to work continuously by allowing a squad of 16 yard shooters to be followed immediately by a squad of skeet shooters, then a squad of duck shooters, etc.; it also affording the gallery the opportunity to witness all three competitions at the same time and further eliminates shifting of the shooters to different grounds under competition or in practice shooting.

A still further object of the invention is the provision of an apparatus, wherein a consolidation is had of a skeet trap shooting ground, the 16 yard trap shooting ground and the over decoy shooting ground, the apparatus in its construction being novel in form and enables shooters to practice all three types of shooting without having to move from one ground to another.

A still further object of the invention is the provision of an apparatus of this character which is comparatively simple in construction, thoroughly reliable and efficient in its purposes, readily and easily controlled, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 3 is an enlarged fragmentary vertical sectional view through the trap trench showing the trap in elevation and arranged in circuit for the operation of the target trap and the flood light.

Similar reference characters indicate corresponding parts throughout the several views in the drawings.

Figure 1:
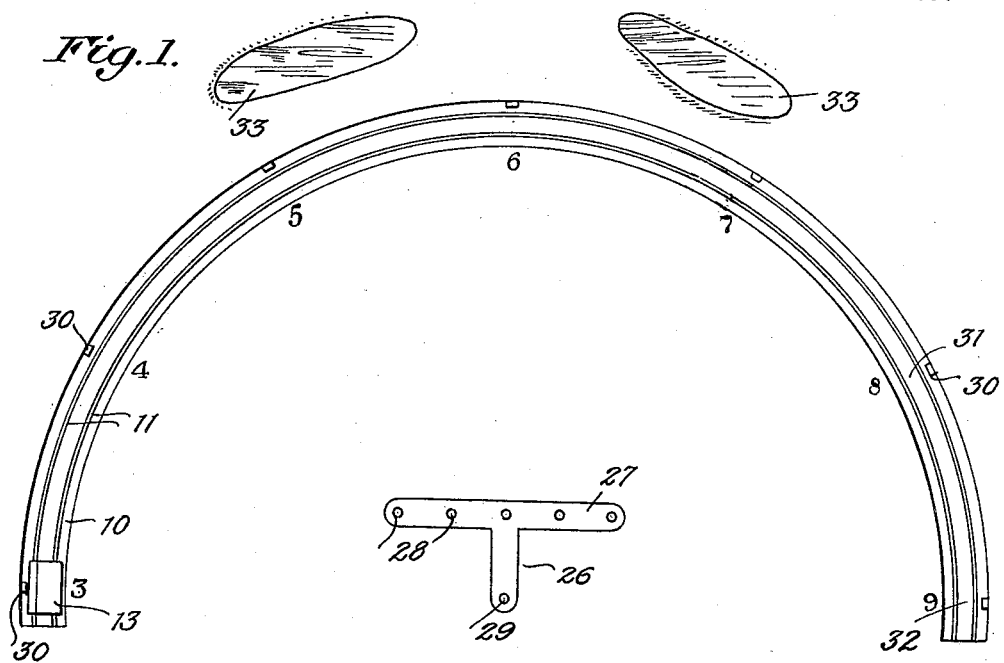
Figure 1 is a diagrammatic layout of the apparatus constructed in accordance with the invention.
Figure 2:
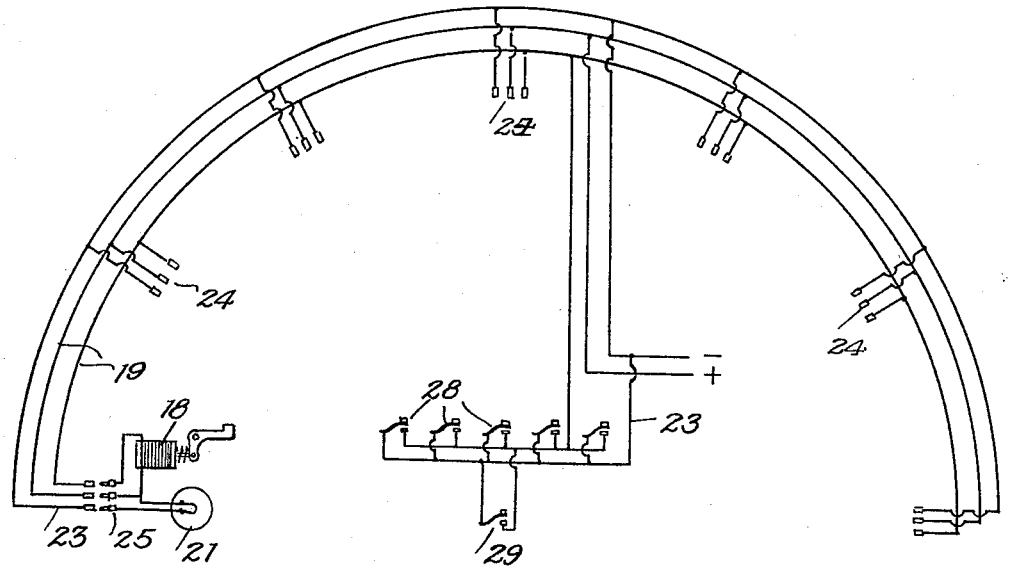
Figure 2 is a diagrammatic plan view of the electrical arrangement of the apparatus.

Referring to the drawings in detail, particularly Figures 1 and 3, there is shown a trench 10 of the proper depth and cut within a foundation, this trench having an arcuate course, or in other words, it is disposed semicircularly. Laid within the bed of the trench 10 is a single track including the rails 11, these being supported upon cross ties 12 embedded in said bed and such rails are fastened thereto in any desirable manner.

Adapted to travel upon this track is a target trap 13 including a body supported by the traction wheels 14, these traveling upon the rails 11 of the track. This trap 13 is moved by a trap boy for its travel upon the track. Upon the body of the trap 13 is supported a stand 15 having a clay pigeon thrower supported upon a tilting table 16 connected through the adjustable joint 17 with the stand 15. The purpose of the tilting arrangement for the table 16 enables the operator to throw the targets at any desired height. The mechanism of the thrower is controlled by an electromagnet 18 arranged in an electric circuit 19 receiving electrical supply from any suitable source.

Upon the trap 13 and rising above the same is a post 20 having an electric flood light 21 adjustable at 22 and this light is arranged in an electric circuit 23.

Arranged at determined intervals in the trench 10 are plugs 24, these intersecting the circuits 19 and 23 and each cooperates with a coupling plug 25 connected with the wires of the circuits 19 and 23 for the thrower and flood light on the trap 13, the plug 25 being manually controlled by the trap boy or attendant.

At the shooters' stand 26 of the layout is arranged a substantially T-shaped switch carrier 27, this being provided with a series of switches 28 and a single switch 29, these being arranged in or common to the circuit 23 and such switches are of a type for foot operation so that the circuit 23 will be closed on the operation of any one of the same by foot power.

The plugs 24 in the trench 10 in number are preferably seven and their locations are identified by suitable markers 30 indicative of the seven skeet positions, namely, 3, 4, 5, 6, 7, 8 and 9. In the skeet shooting the shooter's position is at the stand 26, particularly at the single switch 29 and by operating this switch it will control the thrower mechanism, it being understood of course that the flood light 21 will be illuminated on the engagement of the coupling plug 25 with the plug 24 as the circuit 23 is closed upon making such coupling, while the circuit 19 is open and only closed by manipulation of the switch 29.

In 16 yard trap-shooting the shooter's position will be at either one of the five switches 28 of the series. The target is thrown by depressing the selected switch 28 which releases the thrower mechanism on the trap 13.

In over decoy shooting the shooter's position is at either the single switch 29 or any one of the series of switches 28.

The thrower mechanism is released by closing such switch and the targets from the points 31 and 32 respectively will be thrown over duck ponds 33 as illustrated in Figure 1 of the drawings.

The flood light 21 is usable for night shooting purposes and the light range is such to illuminate the path of the target only.

The trap in its body formation constitutes a house and the attendant or trap boy therefor will be shielded from shooters by the shield or guard 34 built upon the body of the trap 13 as is clearly shown in Figure 3 of the drawings. As has been heretofore stated the trap 13 is shifted manually by the attendant or trap boy.

From the foregoing it is thought that the construction and manner of operation of the apparatus will be clearly understood and therefore a more extended explanation has been omitted. However, it is to be understood that changes, variations and modifications may be made in the invention as fall properly within the scope of the appended claims without departing from the spirit of or sacrificing any of the advantages of the said invention.

What is claimed is:—

1. An apparatus of the character described comprising a trap-shooters' area having series of electric switches, a trench disposed about said area, a movable trap in said trench, a track arranged in the trench and traversed by the trap, a target thrower on the movable trap, and electrically operated means for controlling the thrower and having its electric circuit including said switches.

2. An apparatus of the character described comprising a trap-shooters' area having series of electric switches, a trench disposed about said area, a movable trap in said trench, a track arranged in the trench and traversed by the trap, a target thrower on the movable trap, electrically operated means for controlling the thrower and having its electric circuit including said switches, and markers located at determined intervals throughout the trench for allocating the trap.

3. An apparatus of the character described comprising a trap-shooters' area having series of electric switches, a trench disposed about said area, a movable trap in said trench, a track arranged in the trench and traversed by the trap, a target thrower on the movable trap, electrically operated means for controlling the thrower and having its electric circuit including said switches, markers located at determined intervals throughout the trench for allocating the trap, and a flood light on the trap and electrically controlled.

4. An apparatus of the character described comprising a trap-shooters' area having series of electric switches, a trench disposed about said area, a movable trap in said trench, a track arranged in the trench and traversed by the trap, a target thrower on the movable trap, electrically operated means for controlling the thrower and having its electric circuit including said switches, markers located at determined intervals throughout the trench for allocating the trap, a flood light on the trap and electrically controlled, and a shield on the trap confronting the shooters' area.

5. An apparatus of the character described comprising a trap-shooters' area having series of electric switches, a trench disposed about said area, a movable trap in said trench, a track arranged in the trench and traversed by the trap, a target thrower on the movable trap, electrically operated means for controlling the thrower and having its electric circuit including said switches, markers located at determined intervals throughout the trench for allocating the trap, a flood light on the trap and electrically controlled, a shield on the trap confronting the shooters' area, and plug socket connections arranged in the circuit between the electric means and said switches and located matching said markers.

6. An apparatus of the character described comprising a trap-shooters' area, a trench disposed about said area, a movable trap in said trench, a track arranged in the trench and traversed by the trap, a target thrower on the movable trap, means within said area for controlling the target thrower, markers located at determined intervals throughout the trench, and a shield on the trap confronting the shooters' area.

7. An apparatus of the character described comprising a trap-shooters' area, a trench disposed about said area, a movable trap in said trench, a track arranged in the trench and traversed by the trap, a target thrower on the movable trap, means within said area for controlling the target thrower, markers located at determined intervals throughout the trench, a shield on the trap confronting the shooters' area, and a flood light on the trap and electrically controlled.

In testimony whereof I affix my signature.

CHARLES EDWARD BAND.